United States Patent

Iyengar

[19]

[11] Patent Number: 5,961,601
[45] Date of Patent: Oct. 5, 1999

[54] PRESERVING STATE INFORMATION IN A CONTINUING CONVERSATION BETWEEN A CLIENT AND SERVER NETWORKED VIA A STATELESS PROTOCOL

[75] Inventor: Arun K. Iyengar, Yorktown Heights, N.Y.

[73] Assignee: International Business Machines Corporation, Armonk, N.Y.

[21] Appl. No.: 08/660,633

[22] Filed: Jun. 7, 1996

[51] Int. Cl.[6] ............................. G06F 13/38; G06F 15/17
[52] U.S. Cl. .................... 709/229; 709/228; 709/218; 709/203
[58] Field of Search .................... 395/200.32, 200.48, 395/200.53, 200.59, 182.02, 182.03, 182.05; 709/202, 218, 223, 229, 228, 203; 714/4, 5, 7

[56] References Cited

U.S. PATENT DOCUMENTS

| | | | |
|---|---|---|---|
| 5,218,695 | 6/1993 | Noveck et al. | |
| 5,623,656 | 4/1997 | Lyons | 395/200.49 |
| 5,668,943 | 9/1997 | Attanasio et al. | 395/182.05 |
| 5,701,451 | 12/1997 | Rogers et al. | 395/200.32 |
| 5,708,780 | 1/1998 | Levergood et al. | 395/200.12 |
| 5,710,918 | 1/1998 | Lagarde et al. | 395/200.32 |
| 5,774,670 | 6/1998 | Montulli | 395/200.57 |

FOREIGN PATENT DOCUMENTS

| | | |
|---|---|---|
| 0604010 | 10/1993 | European Pat. Off. |
| 0625750 | 11/1994 | European Pat. Off. |

OTHER PUBLICATIONS

"Haht Software Premiers Hahtsite at Demo 96", PR Newswire, Jan. 29, 1996.

"Proposed HTTP State Management Mechanism", Montulli et al., HTTP Working Group, Feb. 16, 1996.

Louis Perrochon et al., "IDLE: Unified W3–access to interactive information servers", Computer Networks and ISDN Systems, Elsevier Science B.V., pp. 927–938, (1995).

Bertrand Ibrahim, "World–wide algorithm animation", Computer Networks and ISDN Systems, Elsevier Science B.V., pp. 255–265, (1994).

Alan Falconer Slater, "Extending W3 clients", Computer Networks and ISDN Systems, Elsevier Science B.V., pp. 61–68, (1995).

(List continued on next page.)

*Primary Examiner*—Mark H. Rinehart
*Attorney, Agent, or Firm*—Kevin M. Jordan

[57] ABSTRACT

A method and system for preserving state in computers communicating over networks, such as the World Wide Web (WWW) using stateless protocols, e.g., HTTP. State is preserved in a conversation between a client requesting services from a served by performing the service and identifying all continuations (hyperlinks) in an output from the service; recursively embedding the state information in all identified continuations in the output sent to the client. The state information may be embedded and communicated by the server to the client. Alternatively, dynamically downloadable program code may be used to embed the state information at the client. Additional features enable the filtering and/or addition of hyperlinks and data output from the services according to predetermined criteria. State information may be embedded by modifying an identified continuation which is a request for an HTML file, to invoke a CGI converter program with the identified continuation and the state information passed as arguments. State information may also be embedded by modifying an identified continuation which is an invocation to a CGI program with the identified continuation and the state information passed as arguments, and the embedding step is performed by the CGI program. Alternatively, an identified continuation which is an invocation of a CGI program may be modified to invoke a CGI converter program with the identified continuation, an argument counter which indicates a number of arguments associated with the CGI program, and the state information passed as arguments. Here, the embedding is performed by the converter program.

68 Claims, 10 Drawing Sheets

OTHER PUBLICATIONS

"Behind The Scenes of The Adventure Web", http://tjwww.stanford.edu/adventure/impl.html Feb. 23, 1996.

"Aug. 1995 Web Watch", http:www.netgen.com/corpinfo/press/webwtchv6n8.html Feb. 2, 1996.

"Zebrafish Database", http://zfish.uoregon.edu/zf info/dbase/arch.html Oct. 24, 1995.

"Porting Interactive Applications to the Web", http://ksi.cpsc.ucalgary.ca/articles/WWW/PortWeb/PortWeb.html Dec. 7, 1995.

"MBA/MBARI Live Link to The Technology Museum of Innovation in San Jose" http://rockfish.mbari.org/BayLink/http prb.html Aug. 2, 1995.

"Persistent Client State HTTP Cookies", Netscape Communications Corporation, 1996 http://home.netscape.com/newsref/std/cookie_spec.html.

"Hypertext Transfer Protocol—HTTP/1.0" http://www.ics.uci.edu/pub/ietf/http/draft–ietf–http–v10–spec–03.html, by T. Berners–Lee, R. Fielding, and H. Frystyk, Sep. 4, 1995.

"Network News Transfer Protocol: A Proposed Standard for the Stream–Based Transmission of News", RFC 977, B. Kantor and P. Lapsley, UC San Diego and UC Berkeley, Feb. 1986, http://ds.internic.net/rfc/rfc977.txt.

"Simple Mail Transfer Protocol", RFC 821, J.B. Postel, Information Sciences http://ds.internic.net/std/std10.txt.

J. Postel and J.K. Reynolds, "File Transfer Protocol (FTP)", RFC 959, Information Sciences Institute, USC, Oct. 1985 http://ds.internic.net/std/std9.txt.

IBM T.J. Watson Research Center

*T.J. Watson Research Center: Yorktown (left) and Hawthorne.*

- Welcome!
- Local Education Outreach
- Visitor info and local site directions
- Local hotels
- IBM home page -- IBM Research home page

---

Click on icon to send your comments.

Or, contact *webmaster@watson.ibm.com*

---

[ IBM home page | Order | Search | Contact IBM | Help | (C) | (TM) ]

FIG.2
PRIOR ART

SKYLINE SUPPLIERS REGISTRATION FORM

| | |
|---|---|
| USERID | ☐ |
| PASSWORD | ☐ |
| PASSWORD (FOR VERIFICATION) | ☐ |
| ACTUAL NAME | ☐ |
| COMPANY | ☐ |
| E-MAIL ADDRESS | ☐ |
| PHONE NUMBER | ☐ |

[SEND]     [RESET] (RESET FORM)

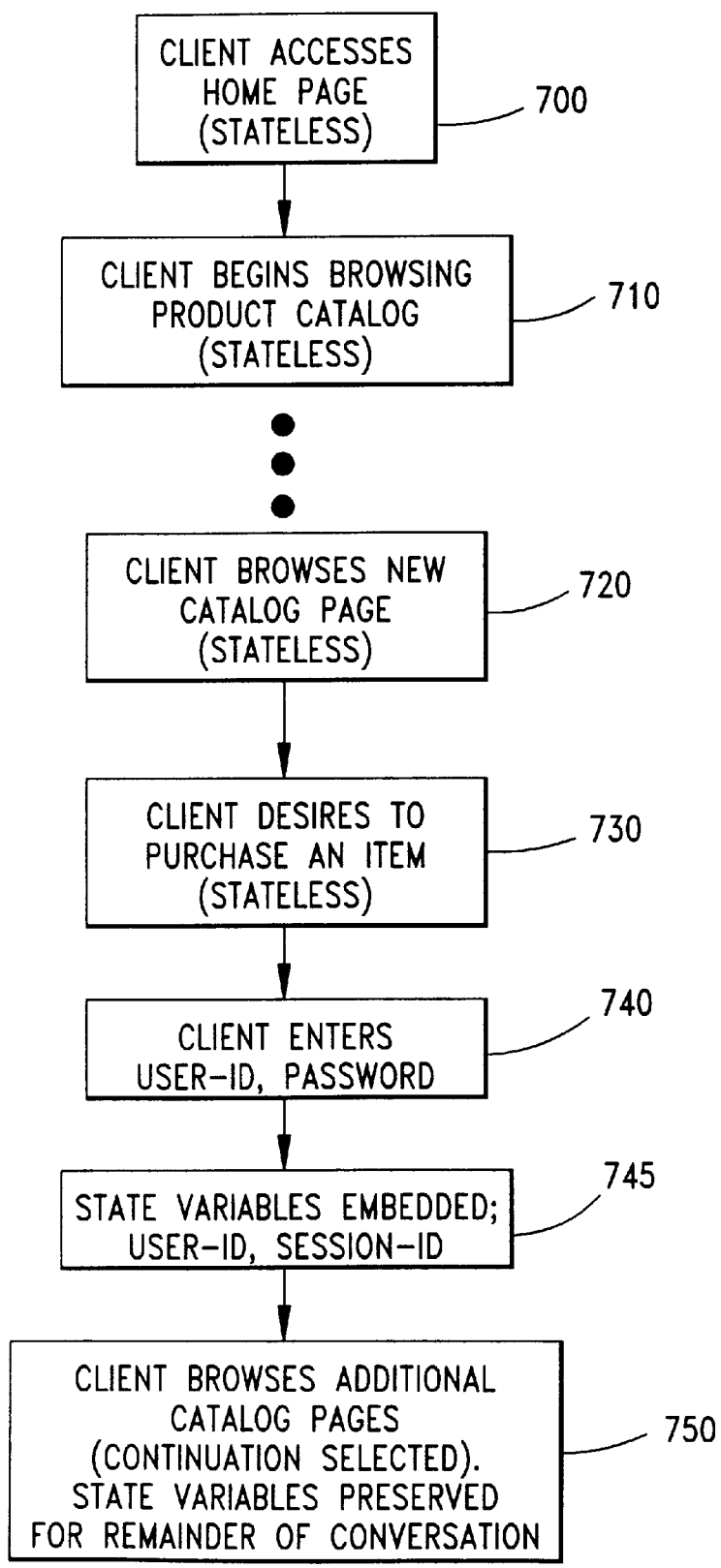

PRESERVING STATE INFORMATION IN A CONTINUING CONVERSATION BETWEEN A CLIENT AND SERVER NETWORKED VIA A STATELESS PROTOCOL

FIELD OF THE INVENTION

This invention is related to computers and computer networks. In particular, the invention is related to computers preserving state while communicating over networks via stateless protocols. Even more particularly, the invention is related to a method and system for preserving state in computers communicating over the Internet, specifically the World Wide Web, using the HyperText Transfer Protocol (HTTP).

CROSS-REFERENCE TO RELATED PATENTS

The present invention is related to the following United States of America Patents:

U.S. Pat. No. 5,752,022, issued May 12, 1998, entitled: "A Method for Creating a Hypertext Language for a Distributed Computer Network," by Chiu et al.; and U.S. Pat. No. 5,710,918, issued Jan. 20, 1998, entitled "Method for Distributed Task Fulfillment of Web Browser Requests," by Lagarde et al. These patents, which have a common assignee, International Business Machines Corporation, Armonk, N.Y., are hereby incorporated by reference in their entirety.

GLOSSARY OF TERMS

While dictionary meanings are also implied by certain terms used here, the following glossary of some terms may be useful.

Internet
  The network of networks and gateways that use the TCP/IP suite of protocols.
TCP/IP
  Transmission Control Protocol/Internet protocol. A packet switching scheme the Internet uses to chop, route, and reconstruct the data it handles, from e-mail to video.
Client
  A client is a computer which issues commands to the server which performs the task associated with the command.
Server
  Any computer that performs a task at the command of another computer is a server. A Web server typically supports one or more clients.
World Wide Web (WWW or Web)
  The Internet's application that lets people seeking information on the Internet switch from server to server and database to database by clicking on highlighted words or phrases of interest (hyperlinks). An Internet WWW server supports clients and provides information. The Web can be considered as the Internet with all of the resources addressed as URLs and which uses HTML to display the information corresponding to URLs and provide a point-and-click interface to other URLs.
Universal Resource Locator (URL)
  A way to uniquely identify or address information on the Internet. Can be considered to be a Web document version of an e-mail address. URLs can be cumbersome if they belong to documents buried deep within others. They can be accessed with a Hyperlink. An example of a URL is "http://www.arun.com:80/table.html". A URL has four components. Starting from the left, the first specifies the protocol to use, separated from the rest of the locator by a ":". Next is the hostname or IP address of the target host; this is delimited by the "//" on the left and on the right by a "/" or optionally a ":". The port number is optional, and is delimited on the left from the hostname by a ":" and on the right by a "/". The fourth component is the actual file name or program name. In this example, the ".html" extension means that this is an HTML file.
Hyperlink (or Hypertext Link)
  A network address embedded in a word, phrase, icon or picture that is activated when you select it. Information about that item is returned to the client and displayed using a Web browser.
HyperText Markup Language (HTML)
  HTML is the language used by Web servers to create and connect documents that are viewed by Web clients. HTML uses Hypertext documents. Other uses of Hypertext documents are described in U.S. Pat. No. 5,204,947, granted Apr. 20, 1993 to Bernstein et al.; U.S. Pat. No. 5,297,249, granted Mar. 22, 1994 to Bernstein et al.; U.S. Pat. No. 5,355,472, granted Oct. 11, 1994 to Lewis; all of which are assigned to International Business Machines Corporation, and which are incorporated by reference herein.
Hypertext Transfer Protocol (HTTP)
  HTTP is an example of a stateless protocol, which means that every request from a client to a server is treated independently. The server has no record of previous connections. At the beginning of a URL, "http:" indicates the file contains hyperlinks.
Home Page
  A multi-media table of contents that guides a web user to stored information, e.g., about an organization, on the Internet.
Web Browser
  A program running on a computer that acts as an Internet tour guide, complete with pictorial desktops, directories and search tools used when a user "surfs" the Internet. In this application the Web browser is a client service which communicates with the World Wide Web.
HTTP Daemon (HTTPD)
  An IBM OS/2 Web Server or other server having Hypertext Markup Language and Common Gateway Interface capability. The HTTPD is typically supported by an access agent which provides the hardware connections to machines on the intranet and access to the Internet, such as TCP/IP couplings.
Continuations
  Hypertext links (or hyperlinks) are examples of continuations in client-server communications. A continuation is a new request which a client may send to a server. Whenever a client requests something from a server, the server may include one or more continuations in its response. When a server responds to a request, it may include one or more continuations which could be any valid requests. However, useful continuations are generally logically related to the original request.
Conversation
  A sequence of communications between a client and server in which the server responds to each request with a set of continuations and the client always picks the next request from the set of continuations. On the Web, hypertext links represent continuations and a client engages in a conversation whenever it follows hypertext links.

BACKGROUND

Networks have transformed the way people do computing. Someone with access to a personal computer or workstation can connect to the Internet and communicate with systems and people all over the world. The World Wide Web (WWW or Web) is a way of using the Internet that provides the user with access via linked documents to a wealth of information distributed throughout the globe. The WWW also allows users to execute programs running on remote servers. This capability enables users to obtain the results from programs which the user cannot run locally due to hardware and/or software limitations. It is also possible to download and run programs stored remotely on the World Wide Web. This has the potential to greatly increase the amount of software which is available to a computer connected to the World Wide Web.

Network Protocols

Network protocols provide standard methods for machines to communicate with one another. The protocols indicate how data should be formatted for receipt and transmission across networks. Heterogeneous machines can communicate seamlessly over a network via standard protocols. Examples of standard Internet protocols include: HTTP, see, e.g., "Hypertext Transfer Protocol—HTTP/1.0", http://www.ics.uci.edu/pub/ietf/http/draft-ietf-http-v10-spec-03.html, by T. Berners-Lee, R. Fielding, and H. Frystyk, Sep. 4, 1995; SMTP, see, e.g, "Simple Mail Transfer Protocol". RFC 821, J. B. Postel, Information Sciences Institute, USC, August 1982, http://ds.internic.net/std/std10.txt.; NNTP, see, e.g., "Network News Transfer Protocol: A Proposed Standard for the Stream-Based Transmission of News", RFC 977, B. Kantor and P. Lapsley, UC San Diego and UC Berkeley, February 1986, http://ds.internic.net/rfc/rfc977.txt.; FTP, see e.g., J. Postel and J. K. Reynolds. "File Transfer Protocol (FTP)", RFC 959, Information Sciences Institute, USC, October 1985, http://ds.internic.net/std/std9.txt.; Gopher, see, e.g., F. Anklesaria, M. McCahill, P. Lindner, D. Johnson, D. Torrey, and B. Alberti. "The Internet Gopher Protocol: A distributed document search and retrieval protocol", RFC 1436, University of Minnesota, March 1993, http://ds.internic.net/rfc/rfc1436.txt.; and WAIS, see, e.g., F. Davis, B. Kahle, H. Morris, J. Salem, T. Shen, R. Wang, J. Sui, and M. Grinbaum. "WAIS Interface Protocol Prototype Functional Specification" (v 1.5), Thinking Machines Corporation, April 1990.

The client-server model constitutes one of the dominant paradigms in network programming, see, e.g., W. R. Stevens, "Unix Network Programming", Prentice Hall PTR, Englewood Cliffs, N.J., 1990; and D. E. Comer, "Internetworking with TCP/IP" vol 1., Prentice Hall, Englewood Cliffs, N.J., 1991 which is hereby incorporated by reference in its entirety. A server program offers a service which can be accessed by multiple users over the network. A program becomes a client when it sends a message to a server and waits for a response from the server. The client process, which is typically optimized for user interaction, uses the requested service without having to know any of the detailed workings of the requested service or server. On the World Wide Web, "browsers" constitute client programs while the programs sending back information to the browser constitute server programs.

A client and server may communicate either synchronously or asynchronously. In a synchronous communication, a client waits for a response from a server before issuing the next request. In an asynchronous communication, the client may issue a request to a server before one or more responses from previous requests to the server have been received.

Many network protocols between a client and server are stateless. This means that every request from a client to a server is treated independently. The server has no record of previous connections. HTTP is an example of a stateless protocol. Two advantages of using stateless protocols are efficiency and simplicity. However, there are situations where it is desirable for maintaining state information during communications between the client and server. For these types of interactions, the statelessness of protocols can present problems.

The HTTP Protocol and the World Wide Web

The most compelling application of the present invention is for browsing the World Wide Web via the HTTP protocol, see, e.g., "Hypertext Transfer Protocol—HTTP/1.0", http://www.ics.uci.edu/pub/ietf/http/draft-ietf-http-v10-spec-03.html, by T. Berners-Lee, R. Fielding, and H. Frystyk, Sep. 4, 1995, which is hereby incorporated by reference in its entirety. Those skilled in the art will understand, however, that the present invention is not limited to HTTP. The relevant aspects of the Web and the limitations imposed by the statelessness of protocols, such as HTTP, will now be discussed.

The World Wide Web consists of multiple servers networked together. Clients typically communicate with servers using a standard browser such as are sold under the trademarks "NETSCAPE NAVIGATOR" by Netscape, "MOSAIC" from NCSA, or "WEB EXPLORER" by IBM. The most common method of communicating between clients and servers is via the HTTP protocol. HTTP allows the client to obtain data from the server either by requesting a file or invoking a program known as a Common Gateway Interface (CGI) program which executes on the server. CGI programming is well known in the art. See, e.g.,"HTML and CGI Unleashed" by John December and Mark Ginsburg, Sams.net Publishing, Indianapolis, Ind. (1995). The server then sends file or the output from the CGI program to the client. Servers typically restrict the files and programs which a client has the ability to access.

The server sends information to the client using the HyperText Markup Language (HTML), see, e.g., "The HTML Sourcebook" by Ian S. Graham, John Wiley & Sons, Inc., New York, 1995, which is hereby incorporated by reference in its entirety. HTML documents consist of conventional ASCII text in which the information to be displayed is interspersed with HTML markup tags. These tags are surrounded by greater than and less than signs (< ... >) and instruct the browser how to interpret different parts of documents. Browsers use Uniform Resource Locators (URLs) to uniquely identify or address information on the Internet. Browsers read HTML documents corresponding to the URLs and display them by following the instructions stored in the markup tags.

The HTML code sequence below (Table 1) shows the HTML text corresponding to the Web home page of the IBM T. J. Watson Research Center on Jun. 3, 1996. This Web page corresponds to the URL "http://www.watson.ibm.com/". The corresponding output that would be displayed on a standard browser accessing this page is shown in FIG. 1.

TABLE 1

The HTML source code corresponding to the IBM T. J Watson Research Center home page.

```
<HTML><HEAD>
<TITLE>IBM T. J. Watson Research Center home page</TITLE>
<meta name="owner" content="calyson@watson.ibm.com">
<meta name="review" content="19960202">
</HEAD>
<BODY>
<IMG SRC="/watson/mast.gif" alt="Research" >
<p>
<h1>IBM T.J. Watson Research Center</h1>
<p>
<IMG SRC="/watson/night.gif" > <IMG SRC="/watson/haw2.gif" >
<br>
<i>T.J. Watson Research Center: Yorktown (left) and Hawthorne.</i>
<p>
<ul>
<IMG align=middle SRC="/watson/bullet.gif" ><A HREF="/watwel.html" >
Welcome!</a>
<br>
<IMG align=middle SRC="/watson/bullet.gif" ><A HREF="/leo" >Local Education Outreach
</a>
<br>
<IMG align=middle SRC="/watson/bullet.gif" ><A HREF="/menu.html" > Visitor info and local
site directions </a>
<br>
<IMG align=middle SRC="/watson/bullet.gif" ><A HREF="/lodging.html" > Local hotels</a>
<br>
<IMG align=middle SRC="/watson/bullet.gif" ><A href="http://www.ibm.com"> IBM home
page</a> -- <A href="http://www.research.ibm.com/"> IBM Research home page</a>
<br>
<ul>
<p>
<hr>
<A HREF="/watson/mail.html" ><IMG align=middle
SRC="/research/images/mail.gif" ></a> <b>Click on icon to send your comments.</b>
<p>
Or, contact <i>webmaster@watson.ibm.com</i>
<p>
<hr>
<Address><homepage@watson.ibm.com></address>
<b>
[
<A href="http://www.ibm.com/">IBM home page</a>|
<A href="http://www.ibm.com/Orders/">Order</a>|
<A href="http://www.austin.ibm.com/search/">Search</a>|
<A href="http://www.ibm.com/Assist/">Contact IBM</a>|
<A href="http://www.ibm.com/Finding/">Help</a>|
<A href="http://www.ibm.com/copyright.html">(C)</a>|
<A href="http://www.ibm.com/trademarks.html">(TM)</a>
]
</b>

</BODY>
</HTML>
```

Many Web browsers allow users to view the HTML source code of any document being viewed. The HTML text in Table 1 is stored in a file accessible to a Web server at the IBM T. J. Watson Research Center. When this Web server receives a request for the URL "http://www.watson.ibm.com/", it sends the appropriate file to the client's browser. The client's browser will then read and display the HTML file. (Table 1 contains a number of relative links. The hypertext links and image files are only valid if the file is stored in a specific directory. If, for example the "night.gif" file in Table 1 is stored at an arbitrary location, the hypertext links will be invalid and the associated images will not appear.)

The line in Table 1 reading "Visitor info and local site directions" is an example of a hypertext link (also called a hyperlink). The corresponding output as it would be displayed by a standard browser is depicted in FIG. 1. When the user clicks on this link as depicted in FIG. 1 when displayed by the browser, a new HTML file, "menu.html", is fetched from the server and displayed by the browser. Hypertext links to documents on both local and remote servers can be placed in an HTML file. The ability to incorporate hyperlinks within an HTML file to link documents on servers all over the world is one of the key features of the World Wide Web. In other words, a Web browser can be used to access information from servers all over the world by simply pointing and clicking on hypertext links.

Recall that Hypertext links are examples of "continuations" in client-server communication. A continuation is a new request which a client may send to a server. Whenever a client requests something from a server, the server may include one or more continuations in its response. The continuations could represent any valid requests. However, useful continuations are generally logically related to the original request. A good set of continuations makes it easy for a client to communicate synchronously with a server.

After each request, the server responds with a set of continuations. The client chooses one of the continuations for the next request. A "conversation" is a sequence of communications between a client and server in which the server responds to each request with a set of continuations and the client always picks the next request from the set of continuations.

On the Web, hypertext links represent continuations and a client engages in a conversation whenever it follows hypertext links. A conversation is interrupted whenever the client obtains a new page by explicitly requesting a new URL instead of following hypertext links. It is possible to continue an interrupted conversation if a page corresponding to the interrupted conversation is still available to the client, e.g., in the browser cache or in disk memory. If so, the conversation may be continued by reloading the page and continuing to follow hyperlinks. A client may communicate with multiple servers during the same conversation.

More formally, a series of HTML pages p1, p2, . . . , pn constitutes a conversation if:
1. p1, p2, . . . , pn were all viewed by a client, and
2. for all i, such that 1<i<=n, page pi was obtained by following a hypertext link on page pi-1.

In an uninterrupted conversation, the client simply follows n-1 hypertext links to get from page p1 to pn without ever "backtracking". In an interrupted conversation, the client backtracks at least once. By backtracking, we mean that the client:
1. Initially visits a page pi where 1<=i<n,
2. Views other pages either by following hyperlinks or explicitly accessing URL's, and
3. Returns to page pi by reloading pi from memory (presuming that pi is still available).

All requests for URL's are stateless. Even if a client requests a page multiple times, the server doesn't maintain any history or knowledge of previous connections. When a client requests an HTML file, there is no way for the client to communicate additional information with the request. Thus, a need exists in the Web environment to preserve state information throughout a conversation while a client is browsing HTML files. The present invention addresses such a need.

For example, consider a server which is handling business transactions. In order to function properly, the server needs state information such as the client's user ID and the transaction number corresponding to the current transaction number. Thus, there is a need to preserve this information while the client is browsing HTML files by following hyperlinks in a conversation. The present invention addresses such a need.

Current Methods for Handling State on the Web

One current method for handling state on the Web involves the use of CGI programs. A client can invoke a CCI program by passing arguments to it. For example, the command, http://tranman.watson.ibm.com/cgi-bin/get-args?var1=7 & var2=10 invokes a CGI program passing the variables var1=7 and var2=10. It is cumbersome to expect the client to follow the exact syntax for passing variables to CGI programs. A more user-friendly method is to allow the user to input arguments via an HTML "form". An example of an HTML form as displayed by a Web browser is shown in FIG. 2. The user fills in the appropriate fields and sends the information to the server by clicking on the send button. The values typed in by the user are passed along as arguments to a CGI script. "Forms" provide a convenient interface for passing arguments to CGI programs. The client does not need to know the details of the CGI program being invoked or the format of the arguments expected by the program.

Forms allow the client to pass state variables to the server. Servers can also use forms to pass variables to the client. Forms may include hidden variables which are not displayed to clients and which are passed back to a server when the client submits the form. Web servers typically preserve state by passing state variables as hidden variables within forms. When the client submits the form, the server receiving the form can obtain the state variables from the hidden fields.

For example, suppose that a business transaction server is communicating with a client. The transaction server needs to obtain a client user ID and a session ID for the remainder of the conversation with the client. The server can obtain the client's user ID from a form submitted by the client. The form invokes a CGI program which then generates a session ID. Each subsequent response from the server is a form. The form is generated dynamically and contains the user and session ID's embedded as hidden variables. Clients respond by completing and submitting the forms generated by the server.

FIG. 3 depicts an example of a current method for preserving state using HTML forms. As depicted, the server 410 embeds state variables in hidden arguments to HTML forms 420 which are generated dynamically. The state variables 425 are passed back and forth between the client 450 and the server 410. Using forms, the client 450 and the server 410 pass the state information 425 back and forth. The server 410 passes the state information to the client by creating HTML forms 420 on the fly and embedding the state variables 425 in hidden fields. The client 450 passes the state information 425 back to the server by completing and submitting the forms 420' generated by the server 410.

Limitations of the Current Technology for Handling State

The problem with the approach just outlined is that it seriously limits the types of interactions between a client and a server during a conversation. The server 410 must always respond to the client 450 with a dynamically generated HTML form 420 containing hidden variables 425. There is no way to preserve state while the client browses HTML files. For example, suppose that the client wishes to browse a catalog in the middle of the session. The catalog consists of HTML files. There is no way to allow the client to browse (different HTML files in) the catalog without losing the state information using current technology. If the server allows the client to continue a conversation by viewing the catalog, the state information will be lost as soon as the client accesses an HTML file from the catalog.

Thus, there is a need for a system and method that allows the client to browse the catalog, i.e., access different HTML files while preserving the state information. The present invention addresses such a need, regardless of whether the HTML files constituting the catalog reside on different servers.

The limitations of the current technology for preserving state have been noted by others, see, e.g., "Persistent Client State HTTP Cookies", Netscape Communications Corporation, 1996, http://home.netscape.com/newsref/std/cookie_spec.html; see also, "Proposed HTTP State-Info Mechanism", D. M Kristol, AT&T Bell Laboratories, Sep. 22, 1995, http://www.research.att.com/~dmk/session01.txt.; and M. Cutler and D. Hall, "August 1995 Web Watch", http://www.netgen.com/corpinfo/press/webwtchv6n8.html. Unlike the solution suggested by Kristol which would modify the HTTP protocol to preserve state, the present invention preserves state without requiring changes to the underlying protocol.

Another solution, by Netscape Communications has been to add a feature called Cookies to their browsers; see "Persistent Client State HTTP Cookies", Netscape Communications Corporation, 1996, http://home.netscape.com/newsref/std/cookie_spec.html. Here, a server can satisfy an HTTP request by appending a state object known as a cookie to its response. The cookie contains a description of the range of URL's for which the state is valid. The cookie is stored by the Netscape browser running on the client. Any future HTTP requests made by the client to one of the URL's specified in the cookie will include a transmittal of the state object stored in the cookie from the client back to the server.

There are a number of drawbacks to this approach. The server application which wishes to preserve state must provide a list of all URL's which might make use of the state. This is cumbersome and may sometimes be impossible. Cookies also lack a method for correlating state information with specific conversations. For example, suppose a browser accesses the same URL in two separate conversations. During the first conversation, state information exists at the time the URL is accessed and is passed to the server via a cookie. During the second conversation, no state information exists at the time the URL is accessed. However, the old cookie still exists and the old state is still passed back to the server. This would confuse the server into believing that the old state information still applies to the new conversation. Another problem is that cookies are not a standard feature and will only work with servers and browsers which support Netscape's protocol.

Thus, there is a need for a method and system for preserving state in a stateless protocol which is not limited to a list of URL's which need to make use of the state information and where state information is correlated with specific conversations to avoid the problem of passing outdated state information to a server. Moreover, there is a need for a system of preserving state in a protocol as HTTP that works with any browser supporting the HTTP protocol and doesn't require specialized nonstandard features on the client or server.

SUMMARY OF THE INVENTION

The present invention, in accordance with the aforementioned needs, is directed to a method and system for preserving state in computers communicating over networks using stateless protocols. Although, the preferred embodiment is for computers communicating over the World Wide Web (WWW or Web) using the Hypertext Transfer Protocol (HTTP), the present invention applies to other forms of networked communication as well.

It is assumed that the services performed by the server on behalf of a client are programs which the client invokes. A service can accept a variable number of arguments. A conversation is a sequence of communications between the client and one or more servers for services wherein each response from the server includes one or more continuations which enable another request for services and wherein the client must invoke one of the continuations to continue the conversation.

Accordingly, a computerized method, system, and computer program product having features of the present invention which preserves state information in a conversation between a client adapted to request services from one or more servers which are networked via a stateless protocol to the client, includes: the client initiating the conversation with the server using the stateless protocol; detecting when the request for a service requires preservation of the state information; performing the service and identifying all continuations in an output from the service, when state is to be preserved; recursively embedding the state information in all identified continuations; and communicating the output to the client; wherein the state information is preserved and provided to all services for the duration of the conversation.

According to another aspect of the present invention, the embedding of state information is performed by the server and communicated by the server to the client. Another aspect of the present invention includes storing at least part of the state information in a memory coupled to the server and embedding an index representing the part of the state information in all identified continuations.

Still another aspect of the present invention includes dynamically downloading computer program code to the client to embed the state information in the output from the service which is also communicated to the client. Yet another aspect of the present invention includes storing at least part of the state information in a memory coupled to the client and embedding an index representing the stored state information.

In a preferred embodiment, our method allows state to be preserved while traversing hypertext links using a Web browser on the World Wide Web. Hypertext links constitute continuations. A client browser follows a conversation by following hypertext links to fetch new pages. The present invention has features which preserves state variables across any conversation. According to one aspect of the present invention, state variables to be preserved throughout a conversation, are passed to every CGI program which could be invoked throughout the conversation.

When the client and the server are networked via the World Wide Web, the stateless protocol is the hypertext transfer protocol (HTTP), and the continuations are hyperlinks to one of hypertext markup language (HTML) files and common gateway interface (CGI) programs, the present invention has features which enable the filtering and/or addition of hyperlinks and data output from the services according to a predetermined criteria. Yet another aspect of the present invention for embedding state information includes modifying an identified continuation which is a request for an HTML file to invoke a CGI converter program with the identified continuation and the state information passed as arguments. Still another aspect of the present invention for embedding state information includes modifying an identified continuation which is an invocation to a CGI program with the identified continuation and the state information passed as arguments, wherein the embedding step is performed by the CGI program. Another aspect of the present invention for embedding state information includes modifying an identified continuation which is an invocation to a CGI program to invoke a CGI converter program with the identified continuation, an argument counter which indicates a number of arguments associated with the CGI program, and the state information passed as arguments, wherein the embedding step is performed by the converter program.

III. BRIEF DESCRIPTION OF THE DRAWINGS

These and other features and advantages of the present invention will become apparent from the following detailed description taken in conjunction with the accompanying drawings, wherein:

FIG. 2 depicts an example of an HTML "form" as viewed by a Web browser;

FIG. 7b depicts an embodiment of a method for preserving state on the system of FIG. 7a;

Figure 9A:
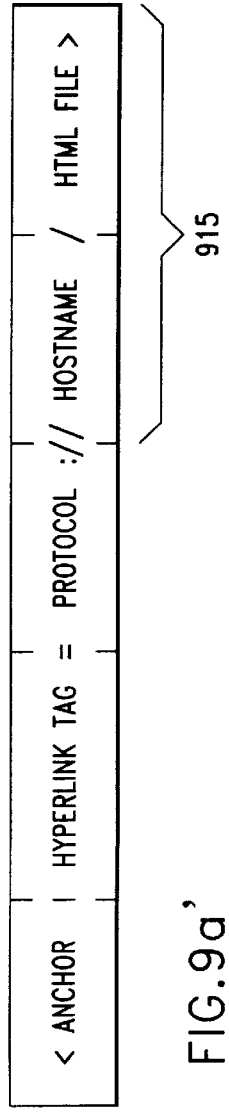
FIG. 9a depicts a structure of a hypertext link to an HTML file.
Figure 9A:
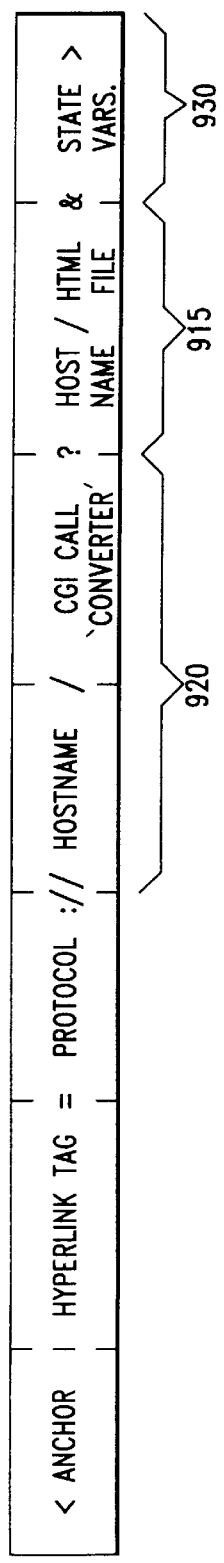
Figure 9B:
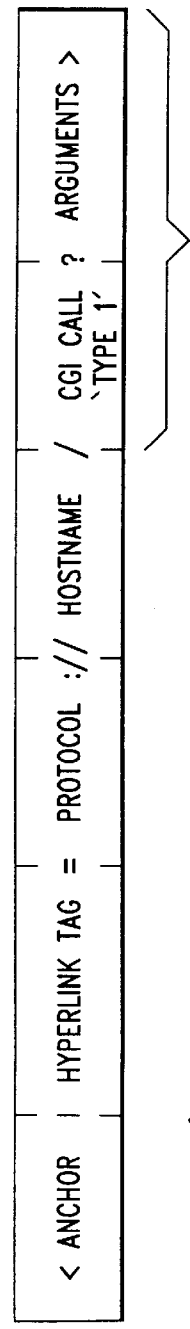
Figure 9B:
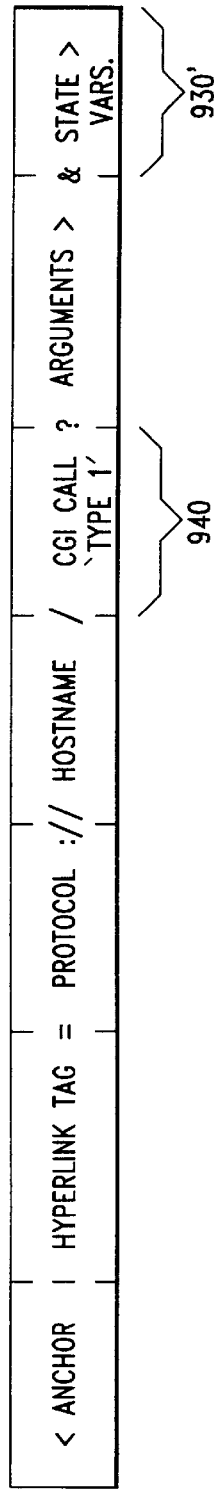
Figure 9C:
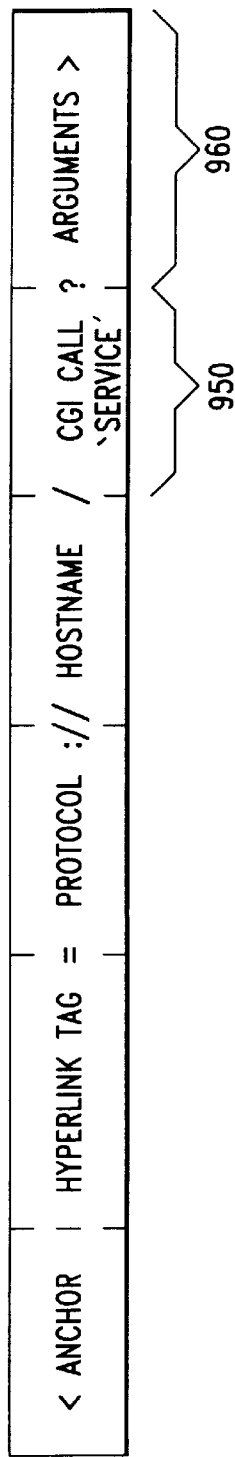
Figure 9C:
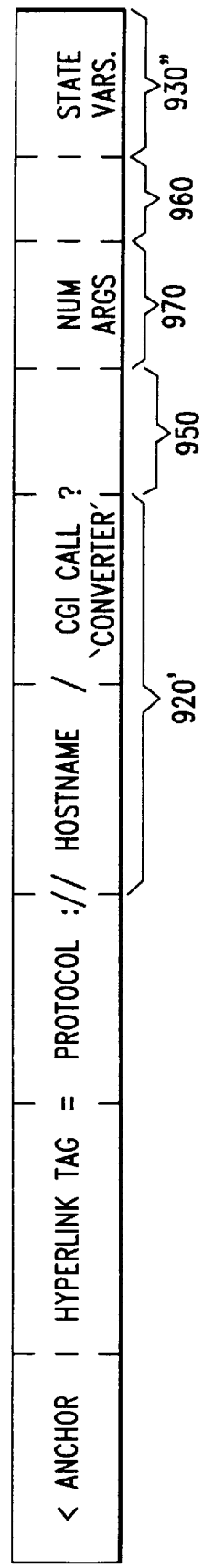

FIG. 9a' depicts the structure of FIG. 9a modified to preserve state in accordance with the present invention;

FIG. 9b depicts a structure of a hypertext link to a type 1 CGI program;

FIG. 9b' depicts the structure of FIG. 9b with embedded state arguments in accordance with the present invention;

FIG. 9c depicts a structure of a hypertext link to a type 2 CGI program; and

FIG. 9c' depicts the structure of FIG. 9c modified to preserve state in accordance with the present invention.

DETAILED DESCRIPTION OF A METHOD FOR PRESERVING STATE IN A CONVERSATION USING A STATELESS PROTOCOL

The present invention is an enabling technology for computers communicating over networks via stateless protocols. Although the preferred embodiment is for computers communicating over the World Wide Web (WWW or Web) using the Hypertext Transfer Protocol (HTTP), the present invention also applies to other forms of networked communication as well.

Figure 1:
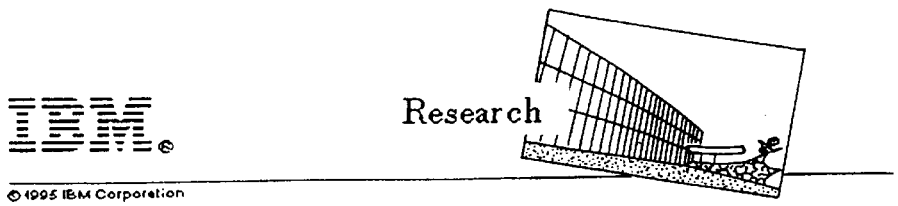
FIG. 1 is an example of an HTML page as displayed by a standard browser.
Figure 1:
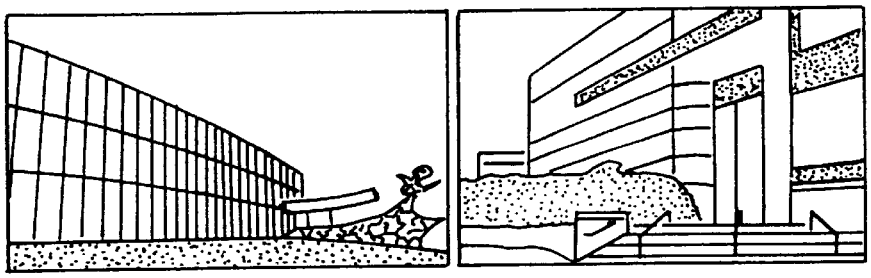
Figure 1:
Figure 3:
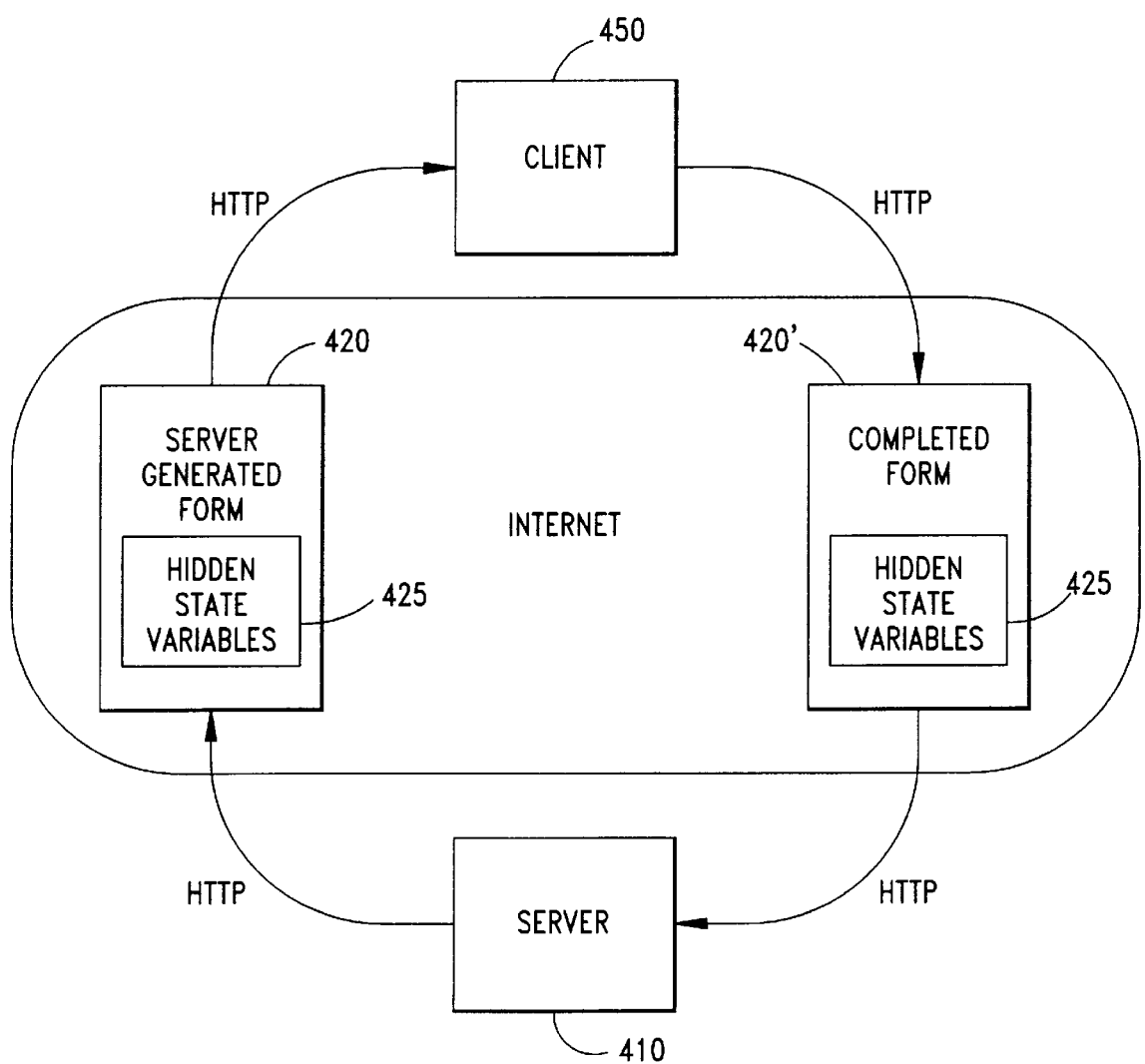
FIG. 3 shows a block diagram of a client and server using a "form" to preserve state variables.
Figure 4:
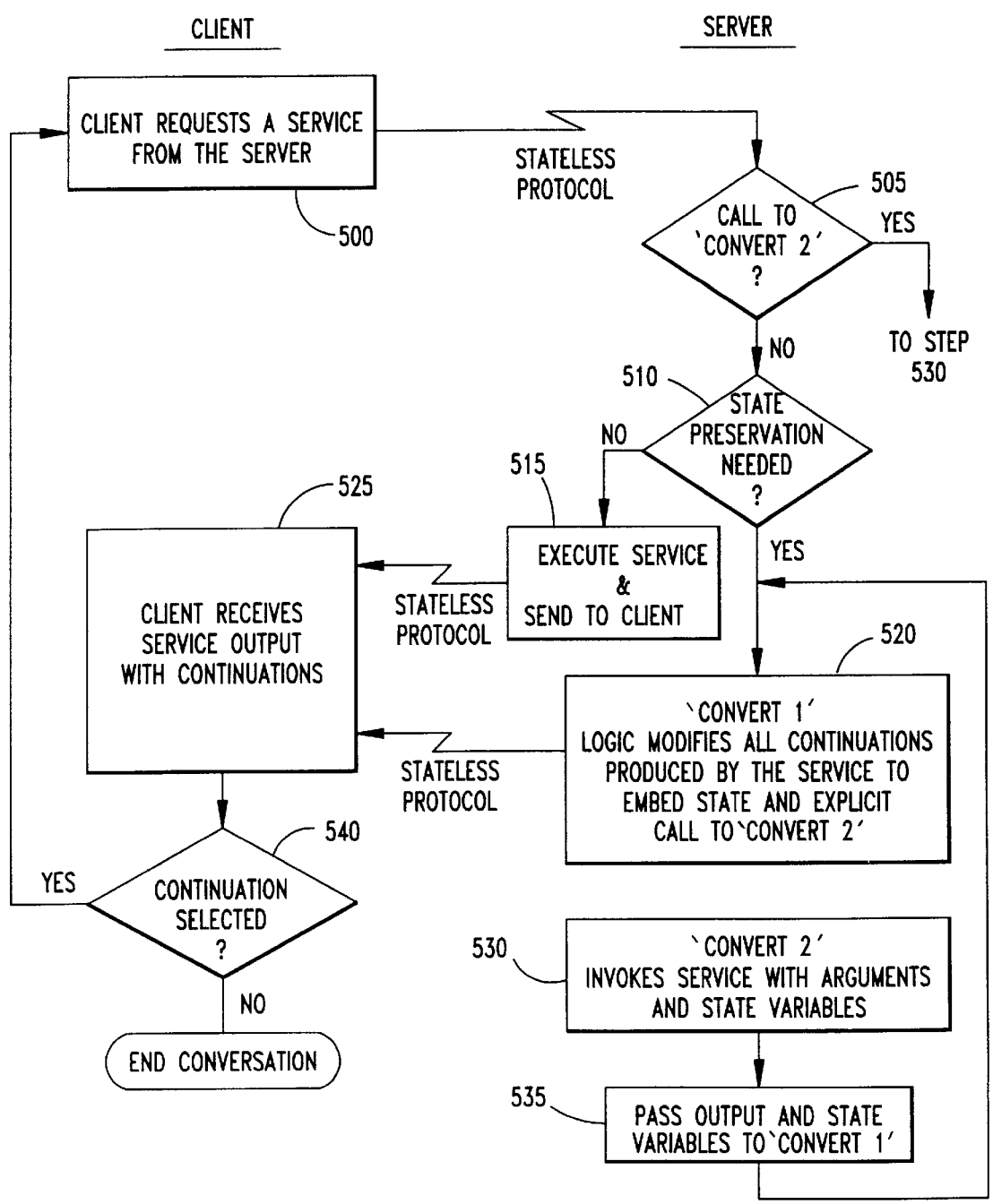
FIG. 4 is a block diagram of a general method for preserving state according to the present invention on a network using a stateless protocol.

FIG. 4 depicts a general method in accordance with the present invention for preserving state using a stateless protocol, i.e., it is not restricted to clients and servers communicating over the World Wide Web. The preferred embodiment, which is described later, is specifically applied to the World Wide Web. Here, it is assumed, for simplicity, that the services performed by the server on behalf of a client are programs which the client invokes and that a service can accept a variable number of arguments.

As depicted, in step 500, a client requests a service from a server. The path represented by steps 505, 510, and 515 would be taken when the services provided do not require state preservation. In step 510, at some point the server processes a request for which the server determines that state variables need to be made available to all services which could be invoked in the current conversation. The server then passes its output and all of the state variables denoted by <state-variable-list> to a program denoted by convert1 and the process continues to step 520. In step 520, the convert1 program modifies the continuations produced by the service but passes back all other data to the client unmodified.

Figure 5:
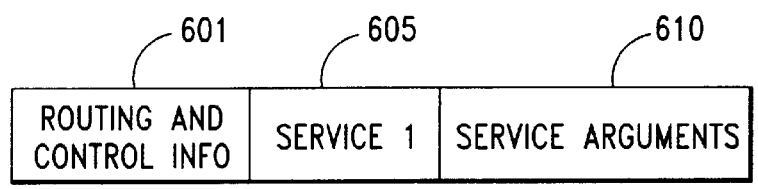
FIG. 5 is a generalized diagram of a data packet for transmission via a stateless protocol.
Figure 6:
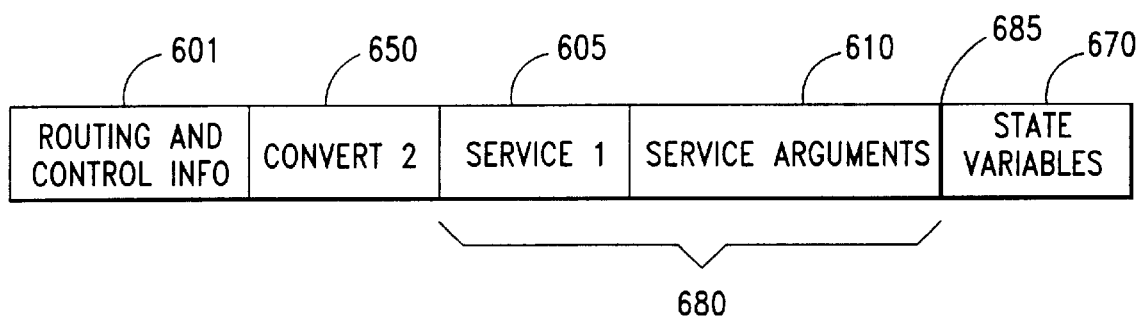
FIG. 6 is an example of the data packet of FIG. 5 modified in accordance with the present invention to preserve state information.

For example, as depicted in FIG. 5, under normal circumstances, a continuation representing a call to a program service1 would be of the form:

$$\text{service1} <\text{service-arg-list}> \quad (1)$$

where service1 605 is a service and <service-arg-list> is the list of service arguments 610 passed to the service if the client chooses the continuation. As depicted in FIG. 6, the convert1 program of the present invention preserves state by modifying each continuation (1) to be of the form:

$$\text{convert2 service-string} <\text{state-variable-list}>, \quad (2)$$

where convert2 650 is a call to a special service (which will be described later), and service-string 680 is a string containing service1 605 and <service-arg-list> 610 and some delimiting information 685 to distinguish the service arguments 610 from <state-variable-list> 670 in the call to convert2 shown in FIG. 6. The <state-variable-list> 670 represents the state information to be preserved and made available to all services for the duration of the conversation.

Referring again to FIG. 4, in step 525, the client receives the output and modified continuations sent from the server. Each modified continuation for the conversation is now a call to the convert2 program, as in (2). In step 540, the client examines the output. If a continuation is selected, the process returns to step 500 where the (modified) service request is sent to the server. In step 505, the server processes the modified service request and invokes the convert2 program and processing continues at step 530 (due to the explicit embedded call of prior step 520). In step 530, (with reference to FIGS. 5 and 6) the convert2 program parses the service 605 and the arguments to be passed to the server (<service-arg-list>) 610 from service-string 680. The convert2 program 650 invokes the requested service 605 (here, service1) by passing it all variables on <service-arg-list> 610 as well as <state-variable-list>. That way, service1 has access to all state variables, as needed. In step 535, the convert2 program receives the service (service1) output and passes the output and the <state-variable-list> to convert1. In step 520, convert1 modifies each of the continuations as discussed above. The output is again communicated to the client in step 525 and the process repeats with the state information 670 preserved for the duration of the conversation.

The Preferred Embodiment

Figure 7A:
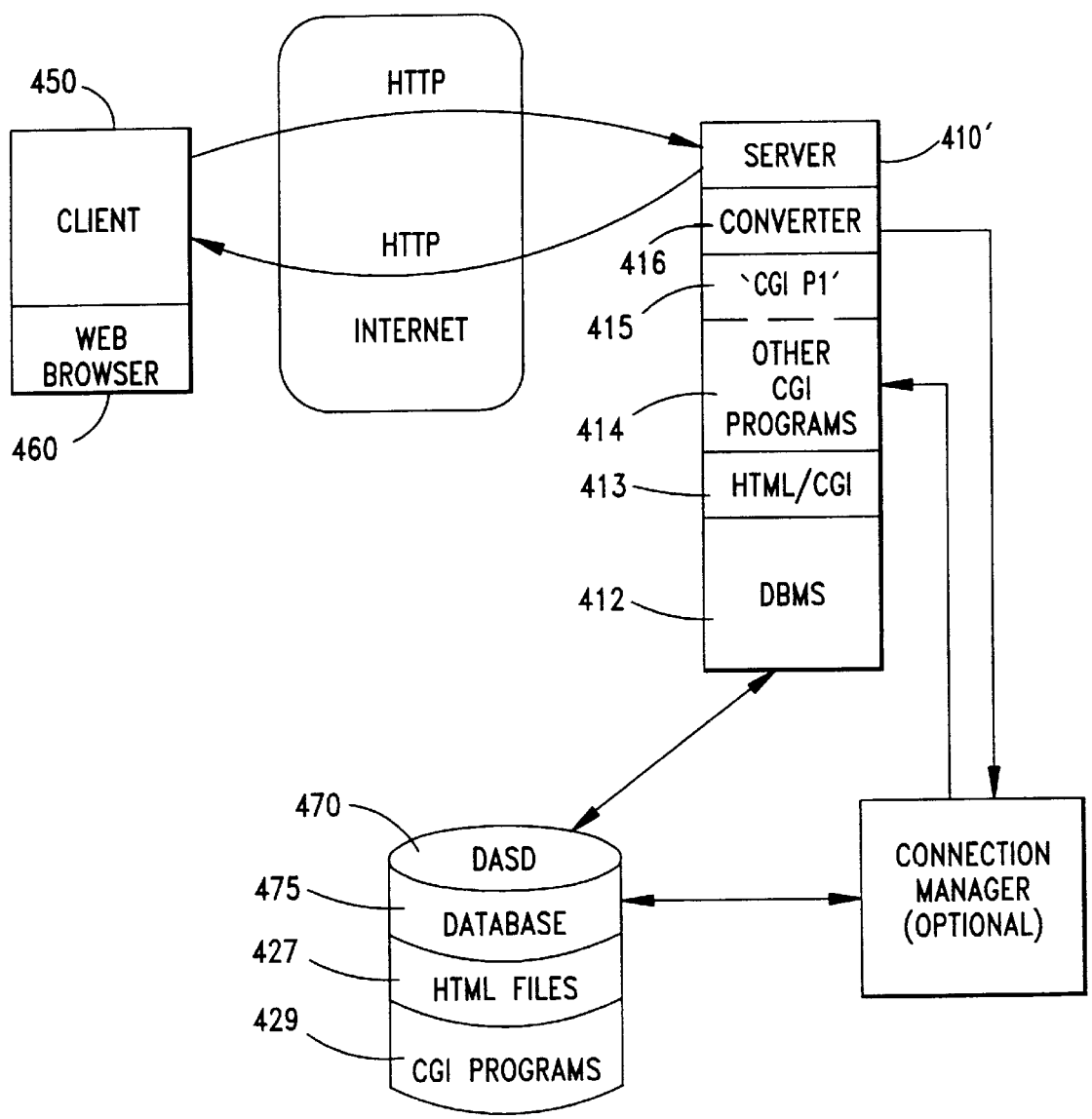
FIG. 7a depicts an embodiment of a system having features of the present invention for transacting business over the World Wide Web while preserving state.

FIG. 7a depicts an embodiment of a system having features of the present invention for transacting business over the World Wide Web. A Web server 410' allows businesses to sell goods over the Internet. Customers access the server 410' via a client 450 running a standard browser 460. In order to communicate securely, the 'browser' 460 should be able to communicate using SSL. See, e.g., A. O. Freier, P. Karlton, P. C. Kocher. "The SSL Protocol Version 3.0", Internet Draft, March 1996, http://home.netscape.com/eng/ssl3/ssl-toc.html, which is hereby incorporated by reference in its entirety. However, some services can be used by browsers which don't support SSL. Users may browse catalogs which may be stored on a stable storage medium such as direct access storage device (DASD) 470. As with conventional catalogs, users browse product descriptions and can pick and choose which items to add to their purchase lists. When the user has determined that the purchase list is complete, he commits to the purchase and is subsequently billed.

As depicted, the server 410' may include a traditional database management system (DBMS) 412 to manage information about the customer, inventory, and products stored in the database 475. An exemplary DBMS is that sold by IBM under the trademark 'DB2'. In addition, the server 410' allows users to browse product catalogs in the course of a conversation. The server 410' assumes very little about the format of product catalogs. Catalogs may consist of HTML files 425 as well as conventional CGI programs. The files and/or programs may be associated with local or remote servers. State information, e.g., a User-ID and session-ID must be maintained between the server 410' and a client 450 during conversations. The present invention provides an improved method and system to transparently maintain this state information during a conversation.

Any client 450 may access a 'home page' associated with the server 410' as well as view product catalogs. In order to purchase products, update customer information, or access certain types of information, it is necessary for the user to provide authentication by entering a User-Id and password. According to the present invention, authentication is only required once per conversation. As soon as a user has been authenticated, the user-id is embedded (preserved) into the conversation by the converter 416 of the present invention.

FIG. 7b depicts an example of a method according to the present invention for a client 450 to interact with the server 410' using HTTP while preserving state. As depicted, in step 700, the client accesses a home page residing on server 410'. In step 710, the client begins browsing a product catalog and in step 720, continues browsing the catalog offerings, e.g., by selecting hyperlinks from the on-line product catalog. Since no authentication is needed to merely browse the catalog, communication is stateless and the number of people which may browse the catalog is maximized. In step 730, an item is found which is to be added to a purchase list. In step 740, the client must then enter a user ID and password to continue. If the client is new to the system, the client picks a user-ID, password, and provides some additional optional information to the server (address, phone number, etc.). In step 745, the converter 416 embeds the user-ID and session-ID into the conversation in accordance with the present invention. In step 750, the user can view additional products, add additional items to the purchase list, commit to purchases, or view and update database information. The state variables are advantageously preserved and re-authentication is not required. The state information, i.e., the user-ID and session-ID will be preserved and made available to every CGI program which is invoked during the remainder of the conversation.

Recall that using current "forms" technology, the user would have to re-enter the user-ID and password each time an action requiring authentication such as adding a new item to the purchase list was attempted. The session-ID would present even greater difficulties in that the server would have to tell the client to remember the session-ID and enter it whenever authentication is needed.

Recall also that using "cookies" limits the range of URL's for which state is preserved. Using cookies further lacks the ability to correlate state information with specific conversations which may cause outdated state information to be provided a server. Lastly, cookies require the use of a specific browser and may require specialized and/or non-standard features on the client or server.

Figure 8:
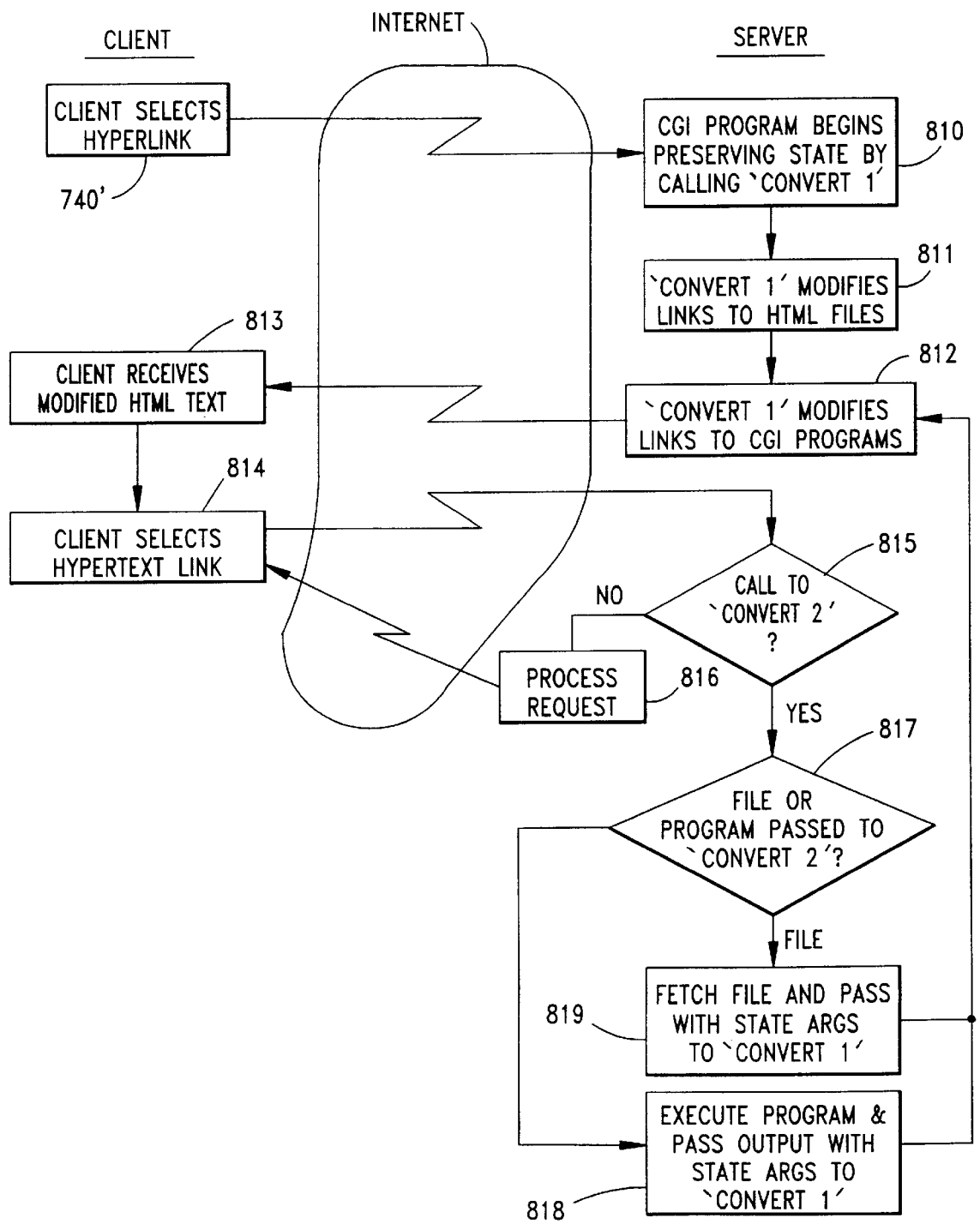
FIG. 8 depicts a more detailed example of a method according to the present invention for preserving state in the system shown in FIG. 7a, and method step 745 of FIG. 7b.

FIG. 8 depicts a more detailed example of a method according to the present invention for preserving state in the system shown in FIG. 7a, and method step 745 of FIG. 7b. Assume that server 410' is a conventional Web server including typical Internet connections and access such as TCP/IP couplings and further has HTML and Common Gateway Interface (CGI) capabilities 413.

As depicted, in step 740', assume a client 450 running Web browser 460 selected a hyperlink to request a service via (stateless protocol) HTTP to a Web server 410'. In step 810, the server 410' interprets the URL, for example, as being a call to a CGI program 'p1' 415 which determines that state variables, e.g., 'x1, x2, . . . , xn', should be embedded in the conversation so that all CGI programs which could be invoked from the conversation are given access. P1 generates an HTML page 'h' with hypertext links for the client 450 to continue the conversation. Instead of returning the output, page 'h' to the client unmodified, 'p1' has been adapted to invoke the converter program 416 of the present invention by passing to a convert1 module of the converter 416 the arguments 'h, x1, x2, . . . , xn'. The call to convert1 could be of the form:

convert1 'h, x1, x2, . . . , xn'

In steps 811 and 812, the convert1 module of the converter program modifies all the hypertext links to HTML in h, to preserve the state variables. All relative hypertext links are converted to absolute hypertext links (also called hyperlinks). See the aforementioned and incorporated by reference U.S. Pat. No. 5,752,022, issued May 12, 1998 to Chiu et al., for an example of a relative to absolute address conversion scheme. As noted, these applications have a common assignee, International Business Machines Corporation, Armonk, N.Y. Those skilled in the art will appreciate that the modification of links to HTML files (step 811) and links to CGI programs (step 812) could be done in a one-pass or a two-pass process within the scope and spirit of the present invention.

As depicted, in step 811 the convert1 module of the converter program 416 takes HTML page h and modifies all the hypertext links to HTML files to preserve the state variables. Hypertext links to HTML files may be modified to be a call to a CGI program convert2 with arguments consisting of h, x1, . . . , xn. With reference to FIG. 9a, consider, for example that h contains the following reference to an HTML file 915 "mail.html", and suppose that the state variables 930 were x=32 and y=45:

<A HREF="http://www.watson.ibm.com/mail.html"> would be modified by the convert1 logic to the form depicted in FIG. 9a':

<A HREF="http://www.watson.ibm.com/cgi-bin/convert2?url=//www.watson.ibm.com/mail.html&x=32& y=45">

In step 812, the convert1 module of the converter program modifies all the hypertext links to CGI programs. Note that hypertext links which are calls to CGI programs may have the state variables preserved two different ways:

(a) As depicted in FIG. 9b', pass the state variables 930' to the CGI program 940 but don't embed the state variables within any hypertext links generated by the CGI program, i.e., don't embed a call to convert2. Using this approach, the CGI program is responsible for propagating state within hypertext links it generates; or (b) Preferably, as depicted in FIG. 9c', pass the state variables 930" to the CGI program 950 and embed the state variables (by an embedded call to the converter 920') within hypertext links generated by the CGI program.

In order to take advantage of both approaches (a) and (b), the converter may determine how to distinguish CGI programs based on any one of a variety of techniques within the scope of the present invention. As depicted in FIG. 9b, for example, a naming convention could be used whereby any CGI program whose name begins with the substring "type" may be considered a type I CGI program and is processed using the first method (a). Any substring whose name does not begin with the substring "type" may be considered a type II CCI program and is processed using the second method (b).

For example, consider (with reference to FIG. 9b) the following example of a type 1 CGI call:
<A HREF="http://www.watson.ibm.com/cgi-bin/type1?arg1=55">

Suppose that the state variables are x=32 and y=45. The converter 416 would append the state variables 930' to the hypertext link to the following form (as depicted in FIG. 9b'):

<A HREF="http://www.watson.ibm.com/cgi-bin/type1?&arg1=55&x=32&y=45">

Now consider, with reference to FIG. 9c, an example of a hypertext link to a type 2 CGI program:

<A HREF="http://www.watson.ibm.com/cgi-bin/prog?arg1=55">

Suppose again that the state variables 930" are x=32 and y=45. The converter would modify this hypertext link to the following form (as depicted in FIG. 9c'):

<A HREF="http://www.watson.ibm.com/cgi-bin/convert2?url=//www.watson.ibm.com/cgi-bin/prog&numargs=1&arg1=55&x=32&y=45"> where the "numargs=1" argument 970 indicates to convert2 that the CGI program 950 initially only had 1 argument passed to it and the remaining arguments are state variables 930" passed by the converter. The modified output is then returned to the requesting client. In step 813, the client 450 receives HTML file h from the server 410'. Every hypertext link (with the exception of hypertext links resulting from type 1 CGI programs) returned to the client is now a call to the convert2 routine of the converter. In step 814 the client 450 running browser 460 selects one of the hypertext links. In step 815, the server determines if the selected hypertext link is a call to convert2. If yes, the process continues at step 817. In step 817, there are two possibilities:

(1) The URL passed to convert2 references an HTML file. Here, the process continues at step 819. Suppose, for example, the client had selected the following link:

<A HREF="http://www.watson.ibm.com/cgi-bin/convert2?url=//www.watson.ibm.com/mail.html&x=32&y=45">

In step 819, convert2 fetches the HTML page contained in the file "mail.html". It then passes the HTML page and the state arguments x=32 y=45 to the convert1 module of the converter and the process returns to step 811, as described previously, or, (2) The hypertext link is a call to a CGI program. In this case, the process continues to step 818. Suppose, for example, the client had selected the following link:

<A HREF="http://www.watson.ibm.com/cgi-bin/convert2?url=//www.watson.ibm.com/cgi-bin/prog&numargs=1&arg1=55&x=32&y=45">

Here, the second argument to convert2, numargs=1, indicates that the initial hypertext link only passed one argument to "prog", i.e., "arg1=55". The other two arguments, "x=32" and "y=45", are state variables which were embedded by the converter 416. Convert2 passes all three arguments to prog, including the state variables. The process then returns to step 811, as described previously.

This method of the present invention advantageously preserves state information by embedding the state in all hyperlinks passed back and forth between the client 450 and server 410. Those skilled in the art will appreciate that, the level of detail which is communicated between the client and server may be reduced by storing most of the state information in a file system or a database 425 coupled to the server 410'. In this case, it is only necessary to pass an index (or pointer) to the state variables back and forth between the client and server.

The present invention is designed to work for a standard browser 460 which doesn't necessarily support downloading of programs from the server which can then execute on the client. For a browser which supports downloadable server programs such as those written using Java ("applets"), or any other such language, additional features are possible. The Java programming environment is well known in the art. See for example, P. Tyma, G. Torok, and T. Downing. "Java Primer Plus", Waite Group Press, 1996, which is hereby incorporated by reference in its entirety. See also Patrick Naughton, "The Java Handbook" Osborne Mcgraw-Hill, 1996, which is hereby incorporated by reference in its entirety. For example, the server 410' could contain a downloadable program which causes the state to be stored at the client. Using this approach, all or part of the state could be stored on the client. An index referencing the location of the state information in memory, as noted above, may be passed back and forth between the server and client to allow the state to be retrieved from the client.

Another application of downloadable server code to the present invention would be to allow the 'converter' 416 to run on the client. Here, clients would download all or part of the 'converter' logic 416 from the server 410' to the client for execution. This would allow the full functionality of the present invention with all (or part of) the processing taking place locally on the client 450. The client no longer has to go through a remote server to filter HTML pages during a conversation; all of the filtering takes place locally. An advantage here is that the load on the server is reduced. In addition, the client will be able to continue conversations even if the server from which the client obtains the applet goes down or becomes unavailable due to a network failure.

Other Embodiments

Preserving State on Multiple Communicating Servers

Those skilled in the art will appreciate that within the scope of the present invention multiple converters may be used for state propagation on multiple servers. For example, an airline reservation system over the Web might have a converter (converter A) for maintaining state. One of the hypertext links might be to a hotel booking system on a remote server with its own converter (converter H). A client might begin using the airline reservation system. At some point, state information is attached to the conversation. The client then follows a hypertext link to the hotel booking system. Converter A continues to maintain state information while the client is using the hotel booking system. All state variables are propagated to the hotel booking system's CGI programs. These remote server CGI programs might simply ignore these state variables. On the other hand, if the hotel booking system understands the state variables from the airline reservation systems, these variables could be used by the hotel booking system (converter H).

At some point, the hotel reservation system server may invoke its converter (converter H) to embed additional state variables. When this happens, the call to converter H may be nested within the call to converter A. This will not present problems. CGI programs will now be passed arguments from both converter A and converter H. If converter A has the ability to recognize a CGI function representing a call to converter H, additional things are possible:

(1) Converter A could treat converter H as a type I CGI program as discussed previously. In this case, converter A can stop monitoring future hypertext links in the conversation.

(2) Converter A could treat converter H as a type II CCI program and continue to modify hypertext links. In addition, converter A could add special links to future HTML pages which would allow the user to escape from the control of either converter.

Other Examples of Dynamic Page Modification

The present invention also has features which provide a system and method for filtering all HTML text viewed by a client while the client is browsing HTML files in a conversation. For example, suppose that a client has contacted a server and started a conversation. The server wishes to filter all HTML text and leave out phrases and hypertext links which have been determined to be objectionable. The present invention provides a method for filtering and/or modifying HTML text while a client accesses files and programs which may be remote to the server doing the filtering.

The present invention can be applied to a wide variety of applications where HTML pages need to be modified during a conversation. For example, suppose that a server application wishes to filter all HTML pages which are passed to a client in a conversation. The converter could modify and/or remove undesirable parts of HTML pages before sending them to the client. The converter would merely have to be modified to search text for different substrings. Note that the converter can censor pages and output from CCI programs which reside on remote servers. If the client can download programs from the server written in a language such as Java, the converter doing the censoring can execute on the client.

As another example, suppose that a client 450 is in a conversation where the names of major corporations appear frequently in the text. A server 410' running a converter 416 has access to a database 475 of home page URL's for major corporations. The server wishes to add hypertext links each time the name of a company in the database appears in an HTML page. For example, each time the name IBM or International Business Machines appears in an HTML page, the server would like to convert the reference to a hypertext link to IBM's home page. By doing this, the client would be able to obtain useful information about companies appearing in the conversation by pointing and clicking. This can be accomplished by modifying the converter 416 to search HTML pages for all company names which appear in the database. Whenever such a name is found, a hypertext link to the company's home page would be inserted into the HTML text returned to the client. The converter 416 can continue to monitor the conversation in the event that hypertext links are followed to remote servers. As noted above, if the client can download programs from the server written in a language such as Java, the converter can execute on the client.

Now that the present invention has been described by way of a preferred embodiment, with alternatives, various improvements will occur to those of skill in the art. Thus, it should be understood that the preferred embodiment has been provided as an example and not as a limitation. The scope of the invention is properly defined by the appended claims.

What is claimed is:

1. A computerized method for preserving state information in a conversation between a client adapted to request services from one or more servers which are networked via a stateless protocol to the client, said services including one or more of data and programs which the client may request, wherein the conversation is a sequence of communications between the client and one or more servers for said services wherein each response from the server includes one or more continuations which enable another request for said services and wherein the client must invoke one of the continuations to continue the conversation, the method comprising the steps of:

the client initiating the conversation with the server using the stateless protocol;

detecting when the request for a service requires preservation of the state information;

performing said service and identifying all continuations in an output from said service, in response to said step of detecting;

recursively embedding the state information in all identified continuations; and communicating the output to the client, in response to said step of embedding; wherein the state information is preserved and provided to all services for the duration of the conversation.

2. The method of claim 1, wherein said step of embedding is performed by the server and said step of communicating is in response to said step of embedding.

3. The method of claim 2, further comprising the step of storing at least part of the state information in a memory coupled to the server and wherein said step of embedding includes embedding an index representing said part of the state information in said all identified continuations.

4. The method of claim 1, further comprising the step of dynamically downloading computer program code to the client to perform said step of embedding which is responsive to said step of communicating the output to the client.

5. The method of claim 4, further comprising the step of storing at least part of the state information in a memory coupled to the client and wherein said step of embedding includes embedding an index representing said part of the state information.

6. The method of claim 1, further comprising the steps of:

the client selecting a second continuation from said all identified continuations with embedded state information; and restoring the state information from said second continuation and invoking an associated second service with restored state information;

recursively identifying and embedding the state information in all continuations associated with an output from said second service.

7. The method of claim 1, further comprising the step of correlating the state information to a specific conversation.

8. The method of claim 1, wherein the client and the server are networked via the World Wide Web, the stateless protocol is hypertext transfer protocol, and the continuations are hyperlinks to one of hypertext markup language files and common gateway interface programs.

9. The method of claim 8, further comprising the step of filtering one of said hyperlinks and data output from said services according to a predetermined criteria.

10. The method of claim 8, further comprising the step of adding one of said hyperlinks and data to said output from said services according to a predetermined criteria.

11. The method of claim 8, wherein said step of embedding further comprises the step of:

modifying an identified continuation which is a request for an HTML file to invoke a CGI converter program with the identified continuation and the state information passed as arguments.

12. The method of claim 8, wherein said step of embedding further comprises the step of:

modifying an identified continuation which is an invocation to a CGI program with the identified continuation and the state information passed as arguments, wherein said step of embedding is performed by the CGI program.

13. The method of claim 8, wherein said step of embedding further comprises the step of:

modifying an identified continuation which is an invocation to a CGI program to invoke a CGI converter program with the identified continuation, an argument counter which indicates a number of arguments associated with the CGI program, and the state information passed as arguments, wherein said step of embedding is performed by the converter program.

14. A program storage device readable by a computer, tangibly embodying a program of instructions executable by the computer to provide a method for preserving state information in a conversation between a client adapted to request services from one or more servers which are networked via a stateless protocol to the client, said services including one or more of data and programs which the client may request, wherein the conversation is a sequence of communications between the client and one or more servers for said services wherein each response from the server includes one or more continuations which enable another request for said services and wherein the client must invoke one of the continuations to continue the conversation, the method comprising the steps of:

the client initiating the conversation with the server using the stateless protocol;

detecting when the request for a service requires preservation of the state information;

performing said service and identifying all continuations in an output from said service, in response to said step of detecting;

recursively embedding the state information in all identified continuation; and communicating the output to the client, in response to said step of embedding; wherein the state information is preserved and provided to all services for the duration of the conversation.

15. A program storage device readable by a computer, tangibly embodying a program of instructions executable by the computer to perform method steps as claimed in claim 14, wherein said step of embedding is performed by the server and said step of communicating is in response to said step of embedding.

16. A program storage device readable by a computer, tangibly embodying a program of instructions executable by the computer to perform method steps as claimed in claim 15, further comprising the step of storing at least part of the state information in a memory coupled to the server and wherein said step of embedding includes embedding an index representing said part of the state information in said all identified continuations.

17. A program storage device readable by a computer, tangibly embodying a program of instructions executable by the computer to perform method steps as claimed in claim 14, further comprising the step of dynamically downloading computer program code to the client to perform said step of embedding which is responsive to said step of communicating the output to the client.

18. A program storage device readable by a computer, tangibly embodying a program of instructions executable by the computer to perform method steps as claimed in claim 14, further comprising the step of storing at least part of the state information in a memory coupled to the client and wherein said step of embedding includes embedding an index representing said part of the state information.

19. A program storage device readable by a computer, tangibly embodying a program of instructions executable by the computer to perform method steps as claimed in claim 14, further comprising the steps of:

the client selecting a second continuation from said all identified continuations with embedded state information; and restoring the state information from said second continuation and invoking an associated second service with restored state information;

recursively identifying and embedding the state information in all continuations associated with an output from said second service.

20. A program storage device readable by a computer, tangibly embodying a program of instructions executable by the computer to perform method steps as claimed in claim 14, further comprising the step of correlating the state information to a specific conversation.

21. A program storage device readable by a computer, tangibly embodying a program of instructions executable by the computer to perform method steps as claimed in claim 14, wherein the client and the server are networked via the World Wide Web, the stateless protocol is hypertext transfer protocol, and the continuations are hyperlinks to one of hypertext markup language files and common gateway interface programs.

22. A program storage device readable by a computer, tangibly embodying a program of instructions executable by the computer to perform method steps as claimed in claim 21, further comprising the step of filtering one of said hyperlinks and data output from said services according to a predetermined criteria.

23. A program storage device readable by a computer, tangibly embodying a program of instructions executable by the computer to perform method steps as claimed in claim 21, further comprising the step of adding one of said hyperlinks and data to said output from said services according to a predetermined criteria.

24. The program storage device readable by a computer, tangibly embodying a program of instructions executable by the computer to perform method steps as claimed in claim 21, wherein said step of embedding further comprises the step of:

modifying an identified continuation which is a request for an HTML file to invoke a CGI converter program with the identified continuation and the state information passed as arguments.

25. The program storage device readable by a computer, tangibly embodying a program of instructions executable by the computer to perform method steps as claimed in claim 21, wherein said step of embedding further comprises the step of:

modifying an identified continuation which is an invocation to a CGI program with the identified continuation and the state information passed as arguments, wherein said step of embedding is performed by the CGI program.

26. The program storage device readable by a computer, tangibly embodying a program of instructions executable by the computer to perform method steps as claimed in claim 21, wherein said step of embedding further comprises the step of:

modifying an identified continuation which is an invocation to a CGI program to invoke a CGI converter program with the identified continuation, an argument counter which indicates a number of arguments associated with the CGI program, and the state information passed as arguments, wherein said step of embedding is performed by the converter program.

27. A computer system for preserving state information in a conversation between a client adapted to request services from one or more servers which are networked via a stateless protocol to the client, said services including one or more of data and programs which the client may request, wherein the conversation is a sequence of communications between the client and one or more servers for said services, wherein each response from the server includes one or more continuations which enable another request for said services and wherein the client must invoke one of the continuations to continue the conversation, the system comprising:

the client being adapted for initiating a conversation with the server using the stateless protocol;

state detection logic for detecting when the request for a service requires preservation of the state information;

search logic for identifying all continuations in an output from said service, in response to said step of detecting;

converter logic for recursively embedding the state information in all identified continuations; and communication logic for communicating the output to the client; wherein the state information is preserved and provided to all services for the duration of the conversation.

28. The computer system of claim 27, wherein said converter logic is executed by the server and said communication logic communicates the output with embedded state information from the server to the client.

29. The computer system of claim 28, further comprising:

a memory, coupled to the server, for storing at least part of the state information; wherein said converter logic is adapted for embedding an index representing said part of the state information in said all identified continuations.

30. The computer system of claim 27, wherein said communication logic communicates the output without embedded state information from the server to the client; and wherein the server is adapted for dynamically downloading said converter logic to the client for execution.

31. The computer system of claim 30, further comprising:

a memory, coupled to the client, for storing at least part of the state information; wherein said converter logic is further adapted for embedding an index representing said part of the state information.

32. The computer system of claim 27, wherein the client selects a second continuation from said all identified continuations with embedded state information, further comprising:

the converter logic being further adapted for restoring the state information from said second continuation, invoking an associated second service with restored state information, and recursively identifying and embedding the state information in all continuations associated with an output from said second service.

33. The computer system of claim 27, wherein the state information is correlated to a specific conversation.

34. The computer system of claim 27, wherein the client and the server are networked via the World Wide Web, the stateless protocol is hypertext transfer protocol, and the continuations are hyperlinks to one of hypertext markup language files and common gateway interface programs.

35. The computer system of claim 34, further comprising filter logic for filtering one of said hyperlinks and data output from said services according to a predetermined criteria.

36. The computer system of claim 34, further comprising integration logic for adding one of said hyperlinks and data to said output from said services according to a predetermined criteria.

37. The computer system of claim 34, wherein said step of embedding further comprises the step of:

modifying an identified continuation which is a request for an HTML file to invoke a CGI converter program with the identified continuation and the state information passed as arguments.

38. The computer system of claim 34, wherein said step of embedding further comprises the step of:

modifying an identified continuation which is an invocation to a CGI program with the identified continuation and the state information passed as arguments, wherein said step of embedding is performed by the CGI program.

39. The computer system of claim 34, wherein said step of embedding further comprises the step of:

modifying an identified continuation which is an invocation to a CGI program to invoke a CGI converter program with the identified continuation, an argument counter which indicates a number of arguments associated with the CGI program, and the state information passed as arguments, wherein said step of embedding is performed by the converter program.

40. A computer system for preserving state information in a conversation between a client adapted to request services from one or more servers which are networked via a stateless protocol to the client, said services including one or more of data and programs which the client may request, wherein the conversation is a sequence of communications between the client and one or more servers for said services wherein each response from the server includes one or more continuations which enable another request for said services and wherein the client must invoke one of the continuations to continue the conversation, the system comprising:

the client being adapted for initiating the conversation with the server using the stateless protocol;

state detection means for detecting when the request for a service requires preservation of the state information;

search means for identifying all continuations in an output from said service, in response to said step of detecting;

converter means for recursively embedding the state information in all identified continuations; and communication means for communicating the output to the client; wherein the state information is preserved and provided to all services for the duration of the conversation.

41. The computer system of claim 40, wherein said converter means is executed by the server and said communication means communicates the output with embedded state information from the server to the client.

42. The computer system of claim 41, further comprising:

a memory, coupled to the server, for storing at least part of the state information; wherein said converter means is adapted for embedding an index representing said part of the state information in said all identified continuations.

43. The computer system of claim 40, wherein said communication means communicates the output without embedded state information from the server to the client; and wherein the server is adapted for dynamically downloading said converter means to the client for execution.

44. The computer system of claim 43, further comprising:
a memory, coupled to the client, for storing at least part of the state information; wherein said converter means is further adapted for embedding an index representing said part of the state information.

45. The computer system of claim 41, wherein the client selects a second continuation from said all identified continuations with embedded state information, further comprising:
the converter means being further adapted for restoring the state information from said second continuation, invoking an associated second service with restored state information, and recursively identifying and embedding the state information in all continuations associated with an output from said second service.

46. The computer system of claim 45, further comprising integration means for adding one of said hyperlinks and data to said output from said services according to a predetermined criteria.

47. The computer system of claim 40, wherein the client and the server are networked via the World Wide Web, the stateless protocol is hypertext transfer protocol, and the continuations are hyperlinks to one of hypertext markup language files and common gateway interface programs.

48. The system of claim 47, wherein said converter means further comprises:
means for modifying an identified continuation which is a request for an HTML file to invoke a CGI converter program with the identified continuation and the state information passed as arguments.

49. The system of claim 47, wherein said converter means further comprises:
means for modifying an identified continuation which is an invocation to a CGI program with the identified continuation and the state information passed as arguments, wherein said converter means comprises the CGI program.

50. The system of claim 47, wherein converter means further comprises:
means for modifying an identified continuation which is an invocation to a CGI program to invoke a CGI converter program with the identified continuation, an argument counter which indicates a number of arguments associated with the CGI program, and the state information passed as arguments, wherein said converter means comprises the converter program.

51. A computerized method for preserving state information in a conversation via a stateless protocol between a client adapted to request services from one or more servers, the method comprising the steps of:
receiving a service request including state information, via the stateless protocol;
identifying all continuations in an output from said service and recursively embedding the state information in all identified continuations, in response to said request; and
communicating a response including the continuations and embedded state information, wherein the continuations enable another service request and one of the continuations must be invoked to continue the conversation.

52. The method of claim 51, wherein said embedding is performed by a server and said step of communicating is in response to said embedding step.

53. The method of claim 52, further comprising the step of storing at least part of the state information in a memory coupled to the server and wherein embedding step includes embedding an index representing said part of the state information in said all identified continuations.

54. The method of claim 51, further comprising the step of dynamically downloading computer program code to the client to perform said embedding step, in response to said step of communicating the output to the client.

55. The method of claim 54, further comprising the step of storing at least part of the state information in a memory coupled to the client and wherein said embedding step includes embedding an index representing said part of the state information.

56. The method of claim 51, further comprising the steps of:
receiving a second request associated with a second continuation from said all identified continuations with embedded state information; and
restoring the state information from said second continuation and invoking an associated second service with restored state information;
recursively identifying and embedding the state information in all continuations associated with an output from said second service.

57. The method of claim 51, wherein the client and the server are networked via the World Wide Web, the stateless protocol is hypertext transfer protocol, and the continuations are hyperlinks to one of hypertext markup language files and common gateway interface programs.

58. The method of claim 57, further comprising the step of filtering one of said hyperlinks and data output from said services according to a predetermined criteria.

59. The method of claim 57, further comprising the step of adding one of said hyperlinks and data to said output from said services according to a predetermined criteria.

60. A program storage device readable by a computer, tangibly embodying a program of instructions executable by the computer to provide a method for preserving state information in a conversation via a stateless protocol between a client adapted to request services from one or more servers, the method comprising the steps of:
receiving a service request including state information, via the stateless protocol;
identifying all continuations in an output from said service and recursively embedding the state information in all identified continuations, in response to said request; and
communicating a response including the continuations and embedded state information, wherein the continuations enable another service request and one of the continuations must be invoked to continue the conversation.

61. A program storage device readable by a computer, tangibly embodying a program of instructions executable by the computer to perform method steps as claimed in claim 60, wherein said step of embedding is performed by the server and said step of communicating is in response to said step of embedding.

62. A program storage device readable by a computer, tangibly embodying a program of instructions executable by the computer to perform method steps as claimed in claim 60, further comprising the step of storing at least part of the state information in a memory coupled to the server and wherein said step of embedding includes embedding an index representing said part of the state information in said all identified continuations.

63. A program storage device readable by a computer, tangibly embodying a program of instructions executable by the computer to perform method steps as claimed in claim 60, further comprising the step of dynamically downloading computer program code to the client to perform said step of embedding which is responsive to said step of communicating the output to the client.

64. A program storage device readable by a computer, tangibly embodying a program of instructions executable by the computer to perform method steps as claimed in claim 60, further comprising the step of storing at least part of the state information in a memory coupled to the client and wherein said step of embedding includes embedding an index representing said part of the state information.

65. A program storage device readable by a computer, tangibly embodying a program of instructions executable by the computer to perform method steps as claimed in claim 60, further comprising the steps of:

receiving a second request associated with a second continuation from said all identified continuations with embedded state information; and restoring the state information from said second continuation and invoking an associated second service with restored state information;

recursively identifying and embedding the state information in all continuations associated with an output from said second service.

66. A program storage device readable by a computer, tangibly embodying a program of instructions executable by the computer to perform method steps as claimed in claim 60, wherein the client and the server are networked via the World Wide Web, the stateless protocol is hypertext transfer protocol, and the continuations are hyperlinks to one of hypertext markup language files and common gateway interface programs.

67. A program storage device readable by a computer, tangibly embodying a program of instructions executable by the computer to perform method steps as claimed in claim 66, further comprising the step of filtering one of said hyperlinks and data output from said services according to a predetermined criteria.

68. A program storage device readable by a computer, tangibly embodying a program of instructions executable by the computer to perform method steps as claimed in claim 66, further comprising the step of adding one of said hyperlinks and data to said output from said services according to a predetermined criteria.

* * * * *